United States Patent
Dravid et al.

(10) Patent No.: US 11,454,596 B2
(45) Date of Patent: Sep. 27, 2022

(54) ORIENTATION DETERMINATION AND MAPPING BY STAGE ROCKING ELECTRON CHANNELING AND IMAGING RECONSTRUCTION

(71) Applicant: Northwestern University, Evanston, IL (US)

(72) Inventors: Vinayak P. Dravid, Glenview, IL (US); Benjamin Myers, Evanston, IL (US); Karl A. Hujsak, Evanston, IL (US)

(73) Assignee: Northwestern University, Evanston, IL (US)

( * ) Notice: Subject to any disclaimer, the term of this patent is extended or adjusted under 35 U.S.C. 154(b) by 108 days.

(21) Appl. No.: 16/771,176

(22) PCT Filed: Jan. 31, 2019

(86) PCT No.: PCT/US2019/015952
§ 371 (c)(1),
(2) Date: Jun. 9, 2020

(87) PCT Pub. No.: WO2019/152585
PCT Pub. Date: Aug. 8, 2019

(65) Prior Publication Data
US 2021/0199604 A1 Jul. 1, 2021

Related U.S. Application Data

(60) Provisional application No. 62/624,221, filed on Jan. 31, 2018.

(51) Int. Cl.
*G01N 23/203* (2006.01)
*G06T 7/30* (2017.01)
(Continued)

(52) U.S. Cl.
CPC ......... *G01N 23/203* (2013.01); *G01N 23/207* (2013.01); *G01N 23/2251* (2013.01);
(Continued)

(58) Field of Classification Search
CPC ............... G01N 23/203; G01N 23/207; G01N 23/2251; G06T 7/30; G06T 7/73; G06T 2207/10061; G06N 20/00; G06V 20/695
See application file for complete search history.

(56) References Cited

U.S. PATENT DOCUMENTS 4,990,779 A 2/1991 Yoshitomi et al.
5,016,266 A 5/1991 Meurtin
(Continued)

FOREIGN PATENT DOCUMENTS

WO WO 2009/056564 A1 5/2009
WO WO 2013/004990 A1 1/2013

OTHER PUBLICATIONS

The International Search Report and the Written Opinion issued in the International Patent Application No. PCT/US19/15952 dated Apr. 23, 2019, pp. 1-11.
(Continued)

*Primary Examiner* — Jurie Yun
(74) *Attorney, Agent, or Firm* — Bell & Manning, LLC

(57) ABSTRACT

A system to generate orientation maps includes a measurement system configured to capture a plurality images of a sample and a computing device in operable communication with the measurement system. The computing device is configured to align the plurality of images of the sample and process the aligned plurality of images to detect one or more regions of interest. The computing device is also configured to generate one or more electron channeling patterns (ECPs) corresponding to the sample based on the one or more regions of interest. The computing device is further config-
(Continued)

ured to generate an orientation map of the sample based on the one or more ECPs.

17 Claims, 16 Drawing Sheets

(51) Int. Cl.
    *G06N 20/00*     (2019.01)
    *G01N 23/207*     (2018.01)
    *G01N 23/2251*     (2018.01)

(52) U.S. Cl.
    CPC ............... *G06N 20/00* (2019.01); *G06T 7/30* (2017.01); *G06T 2207/10061* (2013.01)

(56) References Cited

U.S. PATENT DOCUMENTS

| | | |
|---|---|---|
| 6,326,619 B1 | 12/2001 | Michael et al. |
| 7,091,484 B2 | 8/2006 | Yanagiuchi et al. |
| 9,093,246 B2 | 7/2015 | Preikszas |
| 2005/0115489 A1 | 6/2005 | Triboulet et al. |
| 2010/0237242 A1 | 9/2010 | Schwarzer |
| 2011/0220796 A1 | 9/2011 | Nicolopoulos et al. |
| 2013/0221351 A1 | 8/2013 | Ebata et al. |
| 2016/0133434 A1 | 5/2016 | Kuramoto |
| 2017/0213355 A1 | 7/2017 | Hujsak et al. |
| 2017/0365441 A1 | 12/2017 | Bedell et al. |
| 2018/0211378 A1* | 7/2018 | Bedell .................... G06V 10/44 |

OTHER PUBLICATIONS

Schwarzer, R., "Automated Crystal Lattice Orientation Mapping Using a Computer-controlled SEM," Micron, vol. 28, No. 3, 1997, pp. 249-265.
G. R. Booker et al., "Some comments on the interpretation of the 'Kikuchi-like reflection patterns' observed by scanning electron microscopy," *Philosophical magazine* 16, pp. 1185-1191 (1967).
Coates, D. G. "Kikuchi-like reflection patterns obtained with the scanning electron microscope." The Philosophical magazine: A Journal of Theoretical Experimental and Applied Physics, vol. 16, No. 144 (1967): 1179-1184.
Luo Juan et al., "A Comparison of SIFT, PCA-SIFT and SURF," *International Journal of Image Processing* (IJIP), vol. 3, Issue 4, (2009), pp. 143-152.
G. M. Dilshan Godaliyadda et al., "A Supervised Learning Approach for Dynamic Sampling," *Electronic Imaging* (2016), pp. COIMG-153.1-COIMG-153.8.
Hujsak, Karl, et al. "Suppressing Electron Exposure Artifacts: An Electron Scanning Paradigm with Bayesian Machine Learning," *Microscopy and Microanalysis*, vol. 22, No. .4, (2016), pp. 778-788.
R. A. Schwarzer et al., "Orientation microscopy with fast EBSD," in *Solid State Phenomena*, pp. 295-300 (Trans Tech Publ), 2010.
Gert Nolze, "Image distortions in SEM and their influences on EBSD measurements," *Ultramicroscopy*, vol. 107, pp. 172-183, (2007). Doi10.1016/j.ultramic.2006.07.003.
R. R. Keller et al., "Transmission EBSD from 10 nm domains in a scanning electron microscope," *Journal of Microscopy*, vol. 245, Pt 3 2012, pp. 245-251, Doi:10.1111/j.1365-2818.2011.03566.x (2012).
David C. Joy et al., "Electron Channeling patterns in the scanning electron microscope," *Journal of Applied Physics*, vol. 53, pp. R81-R122, (1982).
Van Essen et al., "Electron channelling patterns from small (10 μm) selected areas in the scanning electron microscope," *Nature*, vol. 225, Feb. 28, 1970, pp. 847-848.

J. Guyon et al., "Sub-micron resolution selected area electron channeling patterns," *Ultramicroscopy*, vol. 149, pp. 34-44, (2015). Doi:http://dx.doi.org/10.1016/j.ultramic.2014.11.004.
C. Van Essen et al., "The generation and identification of SEM channelling patterns from 10 μm selected areas," *Journal of Materials Science*, vol. 6, pp. 213-217 (1971).
S. Singh et al., "Orientation sampling for dictionary-based diffraction pattern indexing methods,". *Modelling and Simulation in Materials Science and Engineering*, vol. 24, pp. 1-31 (2016).
Jiri Dluhos et al., Application of electron channeling contrast imaging in study of polycrystalline materials and visualization of crystal lattice defects, in *21st International Conference on Metallurgy and Materials*, 2012.
Geoffrey E. Lloyd et al., "Discriminatory petrofabric analysis of quartz rocks using SEM electron channelling," *Tectonophysics*, vol. 135, pp. 243-249 (1987).
C. Langlois et al., "Crystal orientation mapping via ion channeling: An alternative to EBSD," *Ultramicroscopy*, vol. 157, pp. 65-72, Doi:http://dx.doi.org/10.1016/j.ultramic.2015.05.023 (2015).
Vasilisa Veligura et al., "Channeling in helium ion microscopy: Mapping of crystal orientation," *Beilstein Journal of Nanotechnology*. vol. 3, pp. 501-506, doi:10.3762/bjnano.3.57 (2012).
Jonathan R. Silk et al., "Determination of lattice orientation in aluminium alloy grains by low energy gallium ion-channelling," Nuclear Instruments and Methods in Physics Research Section B: Beam Interactions with Materials and Atoms 268, pp. 2064-2068, Doi:http://dx.doi.org/10.1016/j.nimb.2010.02.056 (2010).
B. Daudin et al., "Polarity determination of GaN films by ion channeling and convergent beam electron diffraction," *Applied Physics Letters*, vol. 69, pp. 2480-2482 (1996).
L. A. Giannuzzi et al., "Comparison of Channeling Contrast between Ion and Electron Images," *Microsc. Microanal.*, vol. 19, pp. 344-349, 2013.
I. Gutierrez-Urrutia et al., "The effect of grain size and grain orientation on deformation twinning in a Fe-22wt.% Mn-0.6 wt.% C TWIP steel," *Materials Science and Engineering: A*, vol. 527, pp. 3552-3560 (2010).
I. Gutierrez-Urrutia et al., "Dislocation density measurement by electron channeling contrast imaging in a scanning electron microscope," *Scripta Materialia*, vol. 66, pp. 343-346 (2012).
C. Trager-Cowan et al., "Electron backscatter diffraction and electron channeling contrast imaging of tilt and dislocations in nitride thin films," Physical Review B, vol. 75, pp. 085301-085301-8 (2007).
Motomichi Koyama et al., "Hydrogen-assisted failure in a twinning-induced plasticity steel studied under in situ hydrogen charging by electron channeling contrast imaging," *Acta Materialia*, vol. 61, pp. 4607-4618 (2013).
J.-I. Zhang et al., "A study on the geometry of dislocation patterns in the surrounding of nanoindents in a TWIP steel using electron channeling contrast imaging and discrete dislocation dynamics simulations," *Materials Science and Engineering: A*, vol. 636, pp. 231-242 (2015).
Gunawath Mudiyanselage Dilshan Prasanjana Godaliyadda, "A supervised learning approach for dynamic sampling (SLADS)," A dissertation submitted to the Faculty of Purdue University in partial fulfillment of the requirements for the degree of Doctor of Philosophy, Dec. 2017, pp. 1-110.
Aimo Winkelmann et al., "Many-beam dynamical simulation of electron backscatter diffraction patterns," *Ultramicroscopy*, vol. 107, pp. 414-421 (2007).
David G. Lowe, Object Recognition from Local Scale-Invariant Features, in Computer vision, 1999. The proceedings of the seventh IEEE international conference, pp. 1-8 (Ieee).
J. A. Venables et al., "Electron back-scattering patterns—A new technique for obtaining crystallographic information in the scanning electron microscope," *Philosophical Magazine*, vol. 27, pp. 1193-1200, doi:10.1080/14786437308225827 (1973).

\* cited by examiner

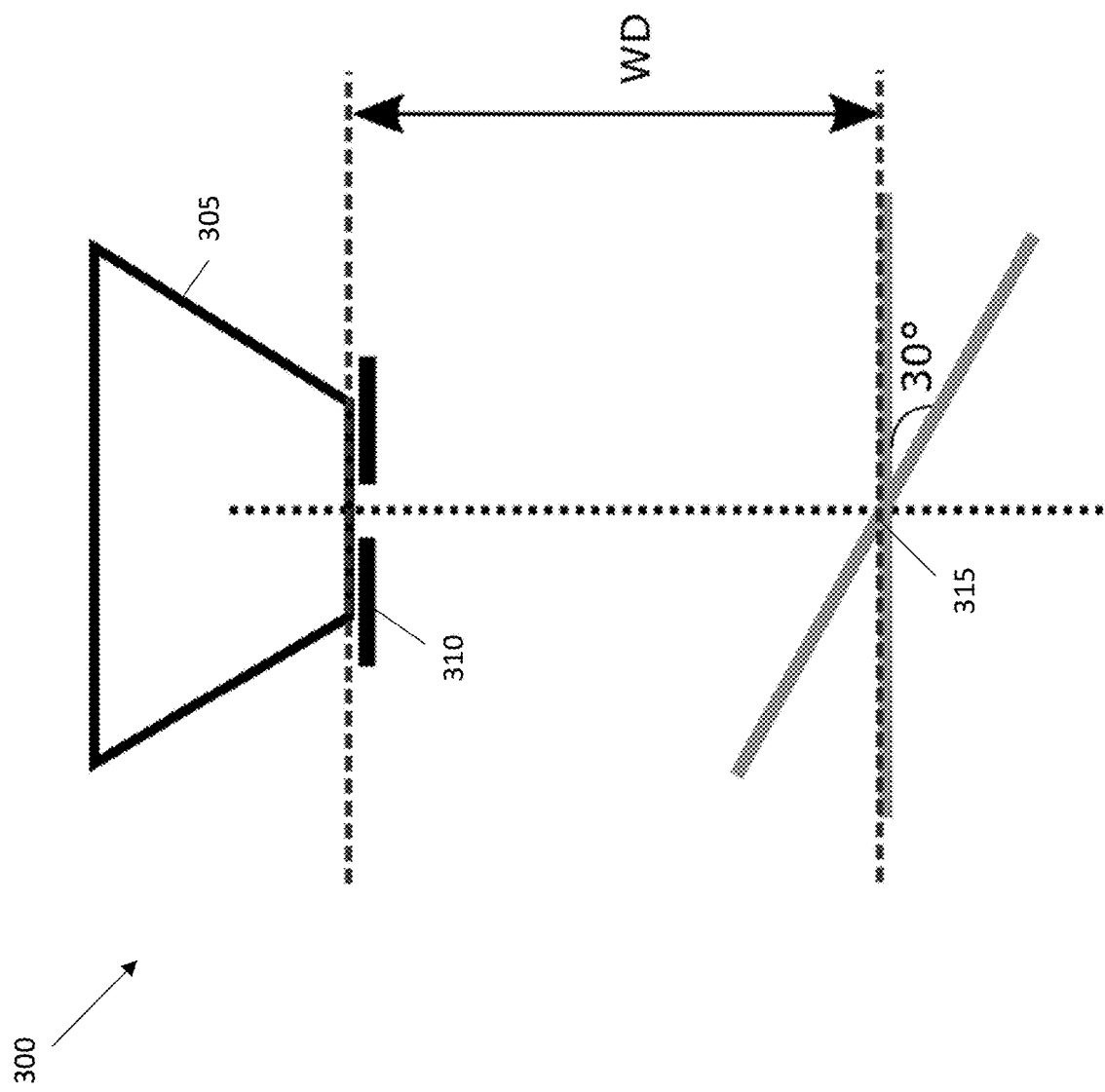

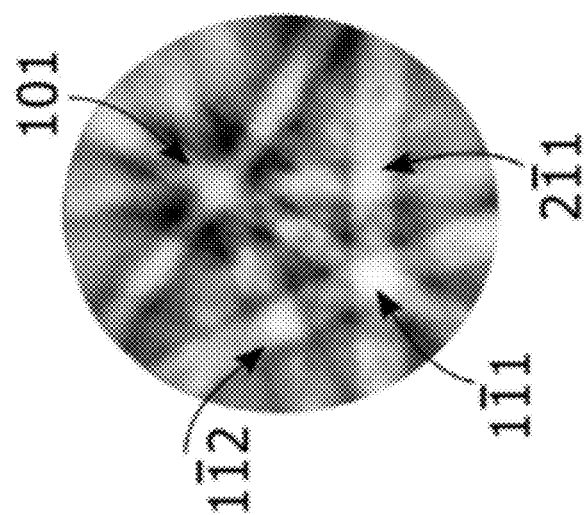
Fig. 11F
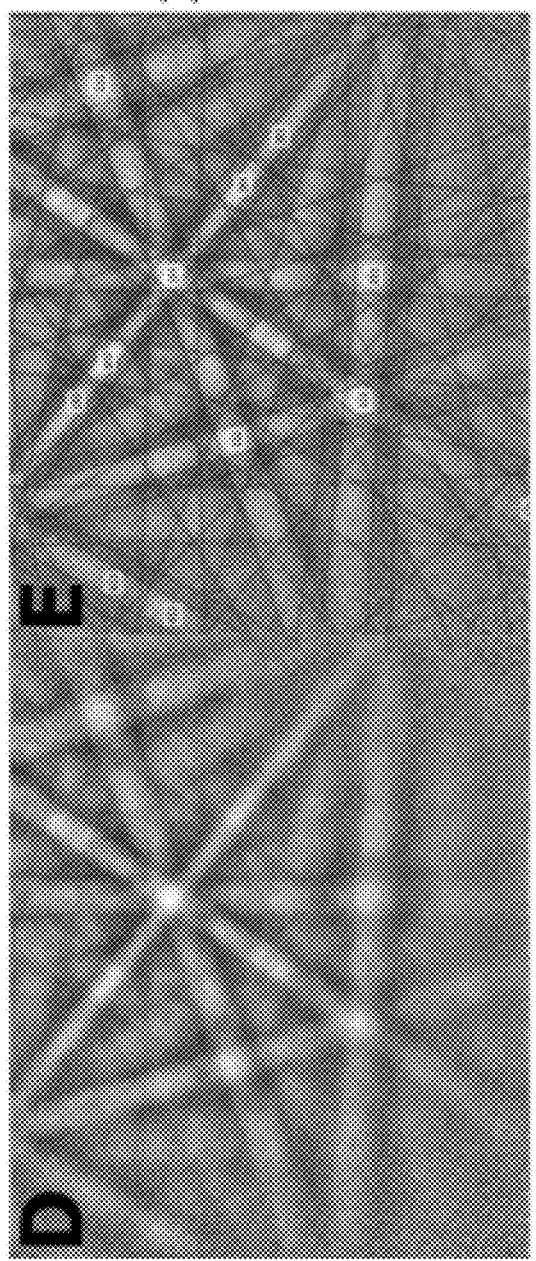
Fig. 11E
Fig. 11D

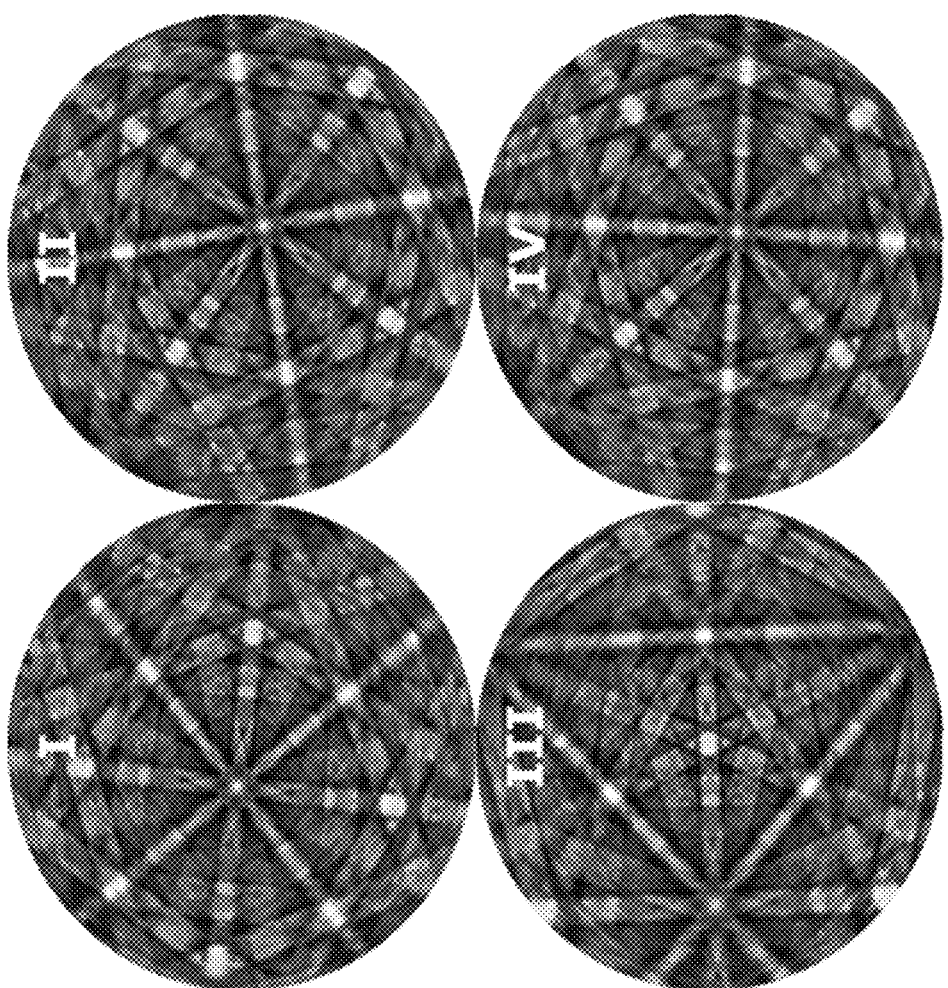
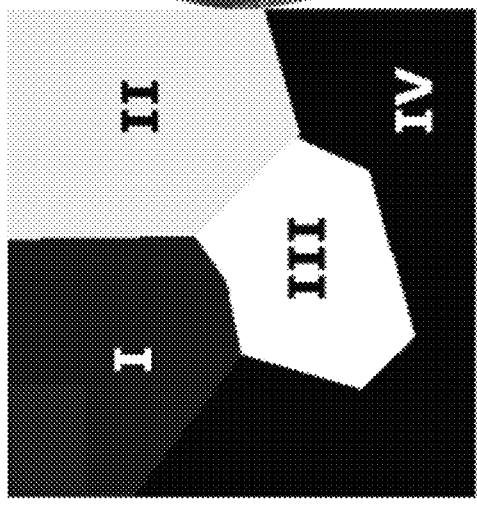
Fig. 14A
Fig. 14B
Fig. 14C
Fig. 14D
Fig. 14E
Fig. 14F

ORIENTATION DETERMINATION AND MAPPING BY STAGE ROCKING ELECTRON CHANNELING AND IMAGING RECONSTRUCTION

CROSS-REFERENCE TO RELATED APPLICATION

The present application claims the priority benefit as a National Stage application of PCT Patent App. No. PCT/US19/15952 filed on Jan. 31, 2019, which claims the priority benefit of U.S. Provisional Patent App. No. 62/624,221 filed on Jan. 31, 2018, the entire disclosures of which are incorporated by reference herein.

BACKGROUND

Crystal orientation mapping is a mapping procedure that enables nanoscale characterization of crystalline materials. The ability to map crystal orientation across large areas (e.g., up to mm$^2$) can help to provide insight into the relationship between material structure, properties, and performance. Current technologies used to perform crystal orientation mapping include electron backscatter diffraction (EBSD) and selected area channeling patterns (SACP).

SUMMARY

An illustrative system to generate orientation maps includes a measurement system configured to capture a plurality images of a sample and a computing device in operable communication with the measurement system. The computing device is configured to align the plurality of images of the sample and process the aligned plurality of images to detect one or more regions of interest. The computing device is also configured to generate one or more electron channeling patterns (ECPs) corresponding to the sample based on the one or more regions of interest. The computing device is further configured to generate an orientation map of the sample based on the one or more ECPs.

An illustrative method for performing orientation mapping includes capturing, by a measurement system, a plurality images of a sample. The method also includes aligning, by a computing device in communication with the measurement system, the plurality of images of the sample. The method also includes processing, by the computing device, the aligned plurality of images to detect one or more regions of interest. The method also includes generating, by the computing device, one or more electron channeling patterns (ECPs) corresponding to the sample based on the one or more regions of interest. The method further includes generating, by the computing device, an orientation map of the sample based on the one or more ECPs.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3 is a schematic of a stage-rocked ECP generation system in accordance with an illustrative embodiment.

FIG. 11D depicts a representative electron backscattering pattern (EBSP) from grain I in the IPFZ map of FIG. 11C in accordance with an illustrative embodiment.

FIG. 11E depicts a representative indexed pattern from grain I in the IPFZ map of FIG. 11C in accordance with an illustrative embodiment.

FIG. 11F depicts a representative OMEC electron channeling pattern from grain I in the IPFZ map of FIG. 11C in accordance with an illustrative embodiment.

FIG. 14A depicts a simulated BSE image at 0 degree tilt and 0 degree rotation for the four reconstructed orientations of FIGS. 14B, 14C, 14E, and 14F in accordance with an illustrative embodiment.

FIGS. 14B, 14C, 14E, and 14F are reconstructed channeling patterns for four differently oriented Austenitic grains in a polycrystalline microstructure after sampling 10% of the possible tilts/rotations using dynamic sampling in accordance with illustrative embodiments.

FIG. 14D depicts a mask of selected tilts/rotations, with white representing a sample position where a simulated BSE image was recorded, and black representing skipped sample positions in accordance with an illustrative embodiment.

DETAILED DESCRIPTION

Figure 1:
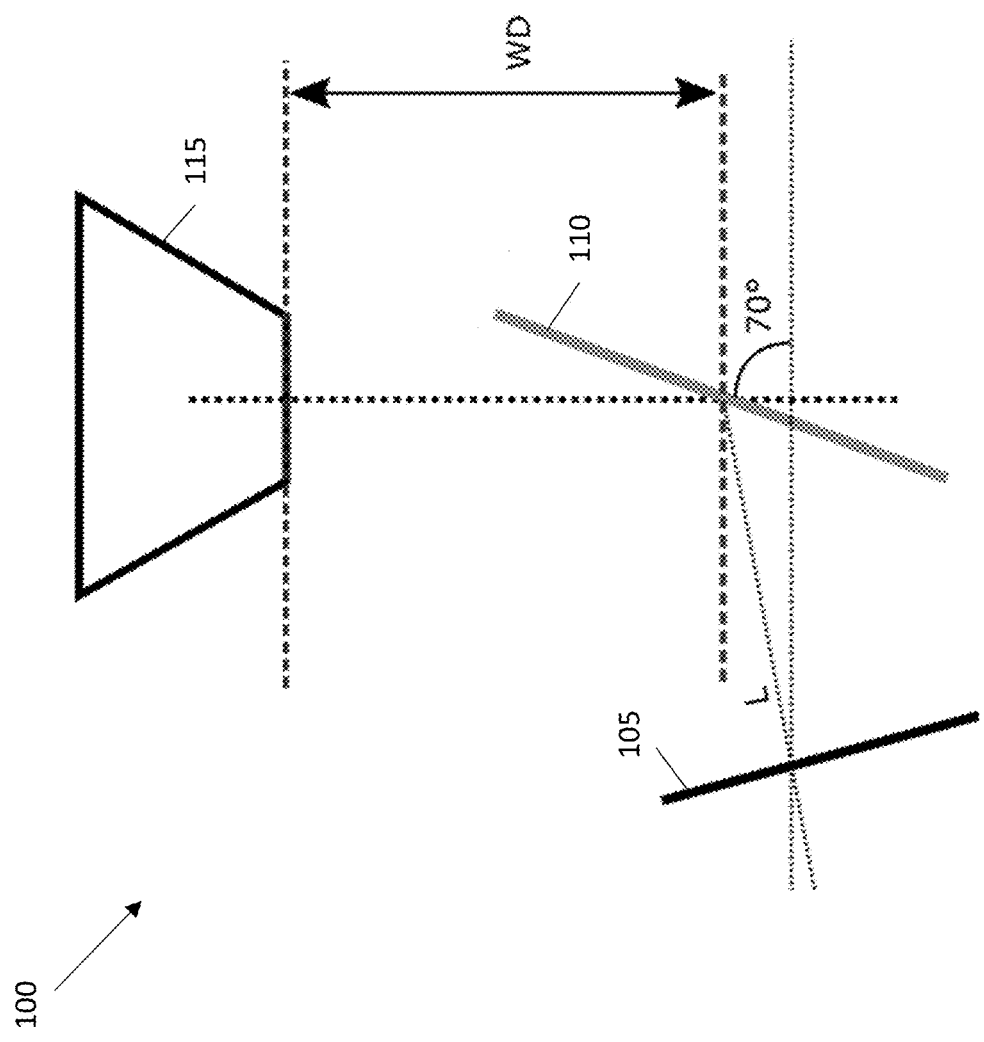
FIG. 1 is a schematic diagram of an EBSD system including an external camera in accordance with an illustrative embodiment.

Existing techniques for performing crystal orientation mapping, such as electron backscatter diffraction (EBSD) and selected area channeling patterns (SACP) by beam rocking, involve specialized instrumentation beyond the standard electron or ion microscope. This specialized instrumentation can be prohibitively expensive. For example, an SACP system with beam rocking utilizes a microscope with costly specialized optics. Similarly, a traditional EBSD system requires at least a costly specialized camera. FIG. 1 is a schematic diagram of an EBSD system 100 including an external camera 105 in accordance with an illustrative embodiment. The EBSD system 100 includes specialized hardware attachments, such as the camera 105 (or detector), which includes a costly phosphor camera and associated hardware. In the EBSD system 100 of FIG. 1, a sample 110 is tilted to a high angle (i.e., 70 degrees) to promote the collection of diffracted backscattered electrons onto the inserted camera (or detector). A working distance, WD, is defined as the distance between a pole-piece 115 of the microscope and a field-of-view on the specimen. A defined camera length, L, describes the physical distance between the specimen and the camera 105. It is noted that in the EBSD system 100 of FIG. 1, there is an oblique angle between the detector and the sample.

Figure 2C:
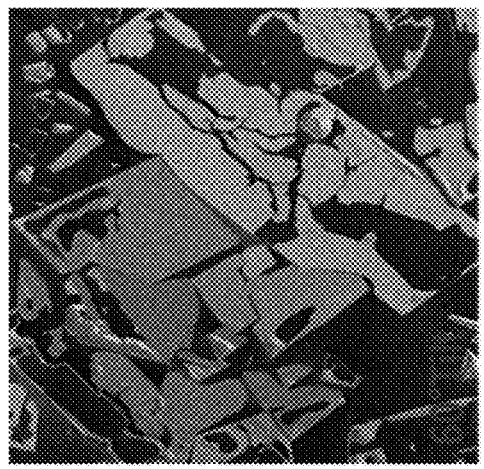
FIG. 2C depicts the BSE signal resulting from a 60 degree tilt in accordance with an illustrative embodiment.
Figure 2B:
FIG. 2B depicts the BSE signal resulting from a 31 degree tilt in accordance with an illustrative embodiment.
Figure 2A:
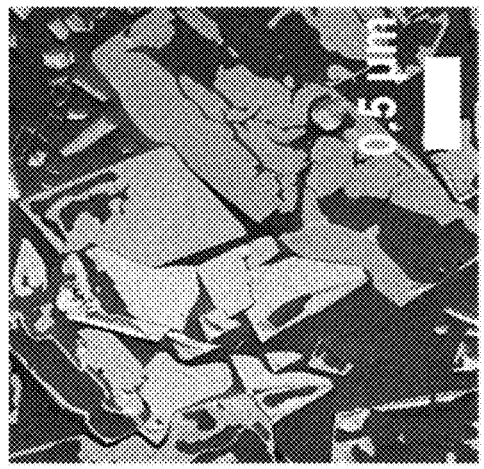
FIG. 2A depicts a backscattered electron (BSE) signal resulting from a 7 degree tilt in accordance with an illustrative embodiment.

FIGS. 2A-2C illustrate the tilt dependence of a backscattered electron (BSE) signal from an aluminum polycrystal specimen. Specifically, FIG. 2A depicts the BSE signal resulting from a 7 degree tilt in accordance with an illustrative embodiment. FIG. 2B depicts the BSE signal resulting from a 31 degree tilt in accordance with an illustrative embodiment. FIG. 2C depicts the BSE signal resulting from a 60 degree tilt in accordance with an illustrative embodiment. As shown, as the angle between the beam and the lattice in each grain shifts, this causes a change in diffraction conditions. This results in a changing BSE yield and corresponding contrast change over stage motion that depends on the individual orientation of each grain.

As discussed in more detail below, the methods and systems described herein have significant advantages over traditional crystal orientation mapping systems. The proposed system is lower cost because it does not utilize specialized hardware attachments (e.g., EBSD) or a specialized microscope (e.g., SACP). The proposed system also enables distortion free geometry, unlike an EBSD system in which samples are mounted at a 70 degree angle. The proposed system enables a large solid angle (e.g., up to 140 degrees or more), whereas EBSD is limited by sample screen distance (typically ~90 degrees) and SACP is limited to less than 10 degrees by spherical aberration. The proposed system also allows for true spherical projection and does not have pattern distortion due to flat screens, as in EBSD. The proposed system also has no sensitivity to spherical aberration, as in SACP systems. Unlike traditional systems, the proposed system provides the ability to energy filter a channeling pattern using standard detectors. The proposed system also allows for variable pattern (angular) resolution, for both large angles (orientation) and small angles (higher order Laue zone (HOLZ) lines analysis). The proposed system further allows for simultaneous electron channeling contrast imaging (ECCI) of images with an ECP map for dislocation imaging by data mining. The proposed system also allows for the collection of high precision elastic strain information by analysis of higher-order Laue zone (HOLZ) lines.

Described herein is a new method and system for capturing stage-rocking electron channeling patters (ECPs) and mapping crystal orientation. The proposed system captures full images at a range of sample orientations by stage tilting (or tilting/rotating), raster-scanning image collection, and the use of computational methods to align the images and reconstruct the ECP. In principal, an ECP can be reconstructed for every pixel in the aligned image stack. The resulting reconstructed ECPs can then be indexed and grain orientation can be mapped. The computational methods (texture, strain analysis, etc.) that have been developed for EBSD analysis can be applied to the ECP maps described herein.

In addition, since the ECP map is effectively captured pixel-by-pixel based on the stage orientation, machine learning algorithms can be applied for predictive sampling and a concomitant reduction in acquisition time. Specifically, because of the nature of the data acquisition in the proposed techniques, machine learning techniques can be applied for predictive sampling and inpainting from sparse data sets, which can dramatically reduce acquisition time. As noted above, analysis of the data acquired in the proposed system also enables other capabilities such as strain mapping, quality control in bulk or thin film materials, and analysis of defects through electron channeling contrast imaging (ECCI). In addition, ECP offers the unique ability to detect higher-order Laue zone (HOLZ) lines, which enables quantitative strain mapping on bulk samples with higher precision and high spatial resolution. Further, ECCI images, such as images of dislocations in thin film materials (e.g., GaN, etc.), are automatically acquired and can be extracted from any relevant orientation in post processing by data mining. The proposed methods and systems can be utilized to perform orientation mapping, phase identification, grain size analysis, texture analysis, strain analysis, defect/dislocation analysis, quality control, etc.

The proposed system does not require costly specialized hardware, but instead uses a stage with relatively high precision (e.g., ~0.5 degrees, depending on the application). Alternatively, a different precision value may be used, such as 0.05 degrees, 0.1 degrees, 0.3 degrees, 0.8 degrees, etc. In the proposed system, stage accuracy is not critical as the computational alignment can detect and correct for any errors in tilt or rotation. In addition, the basic technique is not strictly limited to electron microscopes and can readily be applied in other orientation-dependent imaging techniques such as ion microscopy or x-ray microscopy. The ability to collect ECP maps enables basic functions such as orientation mapping and the associated analytical interpretation of this data in related techniques (e.g., EBSD).

In an illustrative embodiment, the proposed system employs a data collection method that is a hybrid of stage-rocked ECP collection and beam-rocked ECP collection. At every stage-rocked orientation operation, the beam is effectively rocked due to raster scanning so the angular resolution can be dramatically improved compared a stage-rocked pattern alone with limited stage precision.

FIG. 3 is a schematic of a stage-rocked ECP generation system 300 in accordance with an illustrative embodiment. Depicted in FIG. 3 is a pole piece 305 of a microscope, which can be a standard electron microscope or other charged particle microscope. Also shown is a standard BSE detector 310 and motorized sample stage 315 which is configured to hold a sample to be analyzed. The motorized sample stage 315 physically tilts/rotates through a prescribed series of angles while the BSE signal is recorded on the (conventional) BSE detector 310. A working distance (WD) is also shown, which is the distance from the pole piece 305 to the field of view of the sample on the motorized sample stage 315. An angle of the sample stage relative to horizontal is 30 degrees. However, in an illustrative embodiment, the motorized sample stage 315 is used to physically tilt the sample through a prescribed series of angles while the BSE signals are captured by the standard BSE detector 310.

Figure 4:
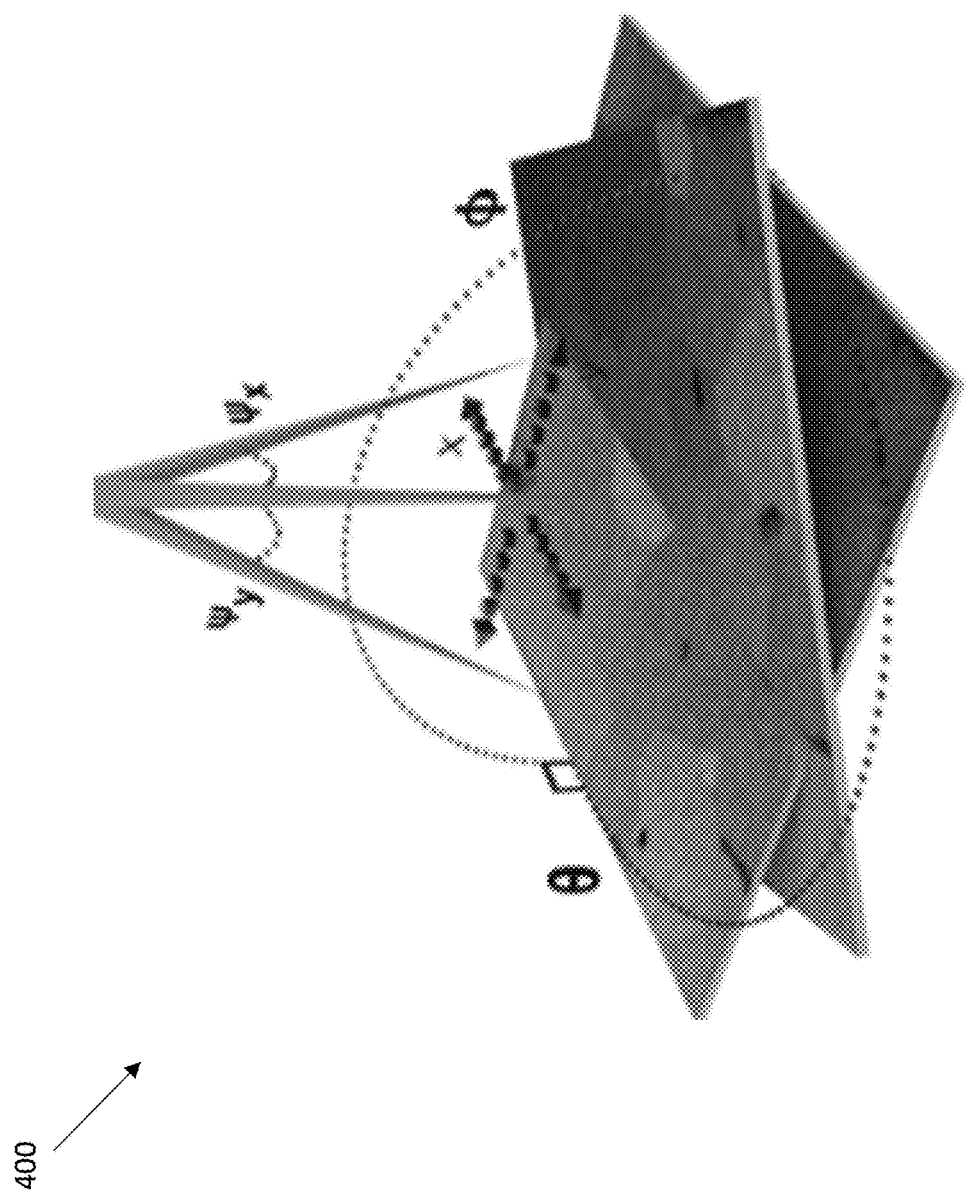
FIG. 4 depicts a motorized sample stage in accordance with an illustrative embodiment.

FIG. 4 depicts a motorized sample stage 400 in accordance with an illustrative embodiment. The motorized sample stage 400 is configured to move in a plurality of different directions, including tilt left, tilt right, tilt back, tilt forward, the x-direction, the y-direction, and/or the z-direction. In another illustrative embodiment, any stage that utilizes a tilt/rotate combination to provide a range of sample beam angles can be used. FIG. 4 also depicts how the motorized sample stage 400 is used to establish variables describing various operations in the orientation mapping by electron channeling methods described herein. These variables include a fixed tilt angle ((p) about a fixed axis and an in-plane rotation angle (θ). As an electron beam rasters across a fixed grid of pixels on a fixed plane defined by x,y, the electron beam experiences a tilt along these axes parameterized by $\psi_x$ and $\psi_y$. In an illustrative embodiment, the motorized sample stage 400 can be part of a FEI Helios NanoLab FIB/SEM system, and can have a precision of ~0.1 degrees. Alternatively, different types of systems and/or precisions may be used. For example, the precision of the stage can be 0.05 degrees, 0.075 degrees, 0.125 degrees, 0.15 degrees, 0.2 degrees, 0.4 degrees, 0.6 degrees, etc. In another illustrative embodiment, the motorized sample stage 400 is capable of both eucentric tilting and computer-controlled eucentric rotation. Alternatively, the stage without eucentric tilting and/or eucentric rotation may be used. As discussed in more detail below, data is collected by automated acquisition through a series of rotation and tilt operations, with an image acquired at each operation.

Figure 5:
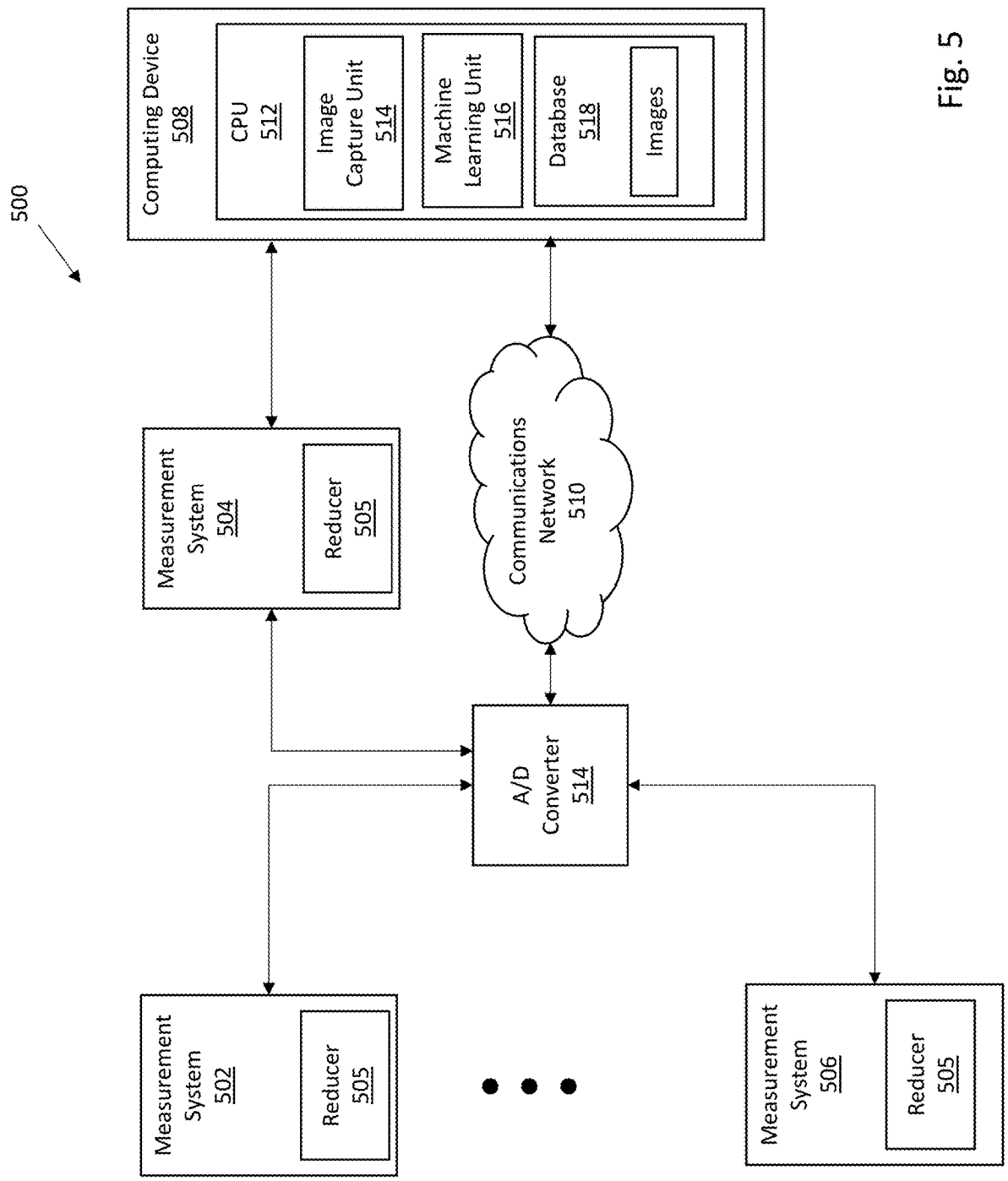
FIG. 5 is a block diagram depicting an example computing architecture of the proposed system in accordance with an illustrative embodiment.

FIG. 5 is a block diagram depicting an example computing architecture 500 of the proposed system in accordance with an illustrative embodiment. The computing architecture 500 includes measurement systems 502, 504, 506 and a computing device 508, all of which may be deployed within the computing architecture 500 to construct ECPs for use in crystal orientation mapping. Although 3 measurement systems are depicted, it is to be understood that in alternative embodiments fewer or additional measurement systems may be used, such as 1, 2, 4, 5, etc. The measurement systems 502, 504, 506 and the computing device 108 are functionally and communicatively connected via a communications network 110, which can be an IP-based telecommunications network, the Internet, an intranet, a local area network, a wireless local network, a content distribution network, a cellular network, or any other type of communications network or combination of networks known in the art. Alternatively, or additionally, the measurement systems 502, 504, 506 and the computing device 108 may be functionally and communicatively connected according to a local arrangement, in which such devices interact directly with one another, such as via a hardline or wireline.

In one embodiment, each of the one or more measurement systems 502, 504, 506 may be any type of scanning electron microscope (SEM) (e.g., designed and developed by all three of the major manufacturers including FEI, JEOL, Hitachi, Tescan) and/or other radiation/charged-particle microscope used for the characterization, orientation, crystallography, and related measurements in crystalline materials.

Figure 6:
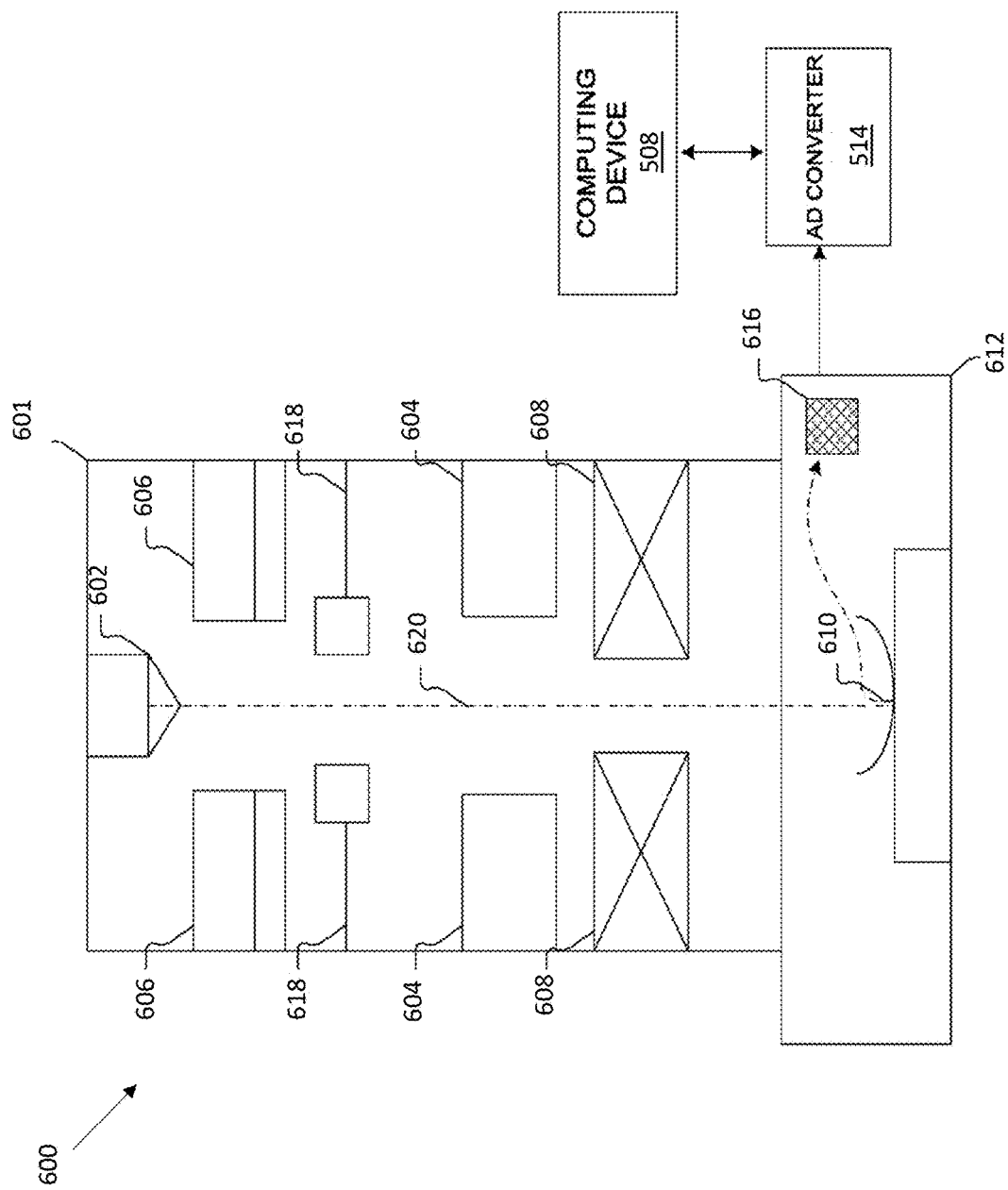
FIG. 6 depicts a scanning electron microscope for use with the proposed system in accordance with an illustrative embodiment.

FIG. 6 depicts a scanning electron microscope 600 for use with the proposed system in accordance with an illustrative embodiment. In alternative embodiments, a different type of microscope may be used. The SEM 600 is an electron microscope that produces images of a sample specimen by scanning it with a focused beam of electrons. Specifically, the electrons interact with atoms in the sample specimen, producing various detectable signals that contain information about the surface topography and composition of the sample. In one specific example, the sample may be scanned in a raster scan pattern, and the beam position can be combined with the detected signal to produce an image. In the embodiment of FIG. 6, the SEM 600 is enclosed within a vacuum chamber 601 and includes an electron gun 602 and a deflecting coil 604. The SEM 600 also includes condenser lenses 606 and an objective lens 608 that focus a primary electron beam 620 emitted from the electron gun 602 and illuminate a sample specimen 610 with the beam. The sample specimen 610 is included within a sample chamber 612.

In an illustrative embodiment, the SEM 600 includes (or communicates with) an analog/digital (A/D) converter such as the A/D converter 514 depicted in FIG. 5. The A/D converter 514 converts an image signal detected by a secondary electron detector 616 into a digital image signal, which in turn, may be transmitted to the computing device 508. It is contemplated that any electron detector that is able to sense a change due to electron channeling can be used in the proposed system, such as a secondary electron detector, a backscattered electron detector, a secondary ion detector, etc.

Referring again to FIG. 5, a reducer 505 is employed in each of the measurement systems 502, 504, 506 to turn the emitted energy beam on/off when generating images. In one embodiment and with reference again to FIG. 6, the SEM 600 may be operatively connected to, or otherwise include, a reducer system 618. In alternative embodiments, reducers may not be used in the system. Reducer system 618, if included, can be used to blank/unblank a beam of electrons generated and/or otherwise provided by the SEM 600, according to an on/off control mechanism that is synchronized with the scanning of the electron beam from the electron gun 602. The reducer system 618 reduces the number of pixels sampled in each image to save time.

In one embodiment, a reduction in acquisition time may be achieved through reducing the number of sample orientations that are imaged. For example, in one embodiment, each image may be fully sampled, and certain images can be prioritized at certain angles and orientations over other images to thereby reduce the information in the orientation space and improve efficiency. Reducing the number of sample orientations reduces the number of pixels in the reconstructed ECP.

Referring again generally to FIG. 5, the computing system 506, to which the measurement systems 502, 504, 506 and their associated reducers 105 are connected, includes a CPU 512. The CPU 512 controls an image capture unit 514 that captures images (e.g., full or incomplete and/or intentionally under-sampled) generated by the measurement systems 502, 504, 506. The image capture unit 514 can be a camera or any other type of imaging detecting/capturing device known in the art. The CPU 512 also includes a machine-learning unit 516 that executes various algorithms for constructing ECPs for use in crystal orientation mapping, based on images captured by the image capturing unit 514. In at least some embodiments, the computing device 508 also includes a database 518 for storing and retrieving images, orientation mappings, and other data.

Although the image capture unit 514, the machine learning unit 516, and the database 518 of FIG. 5 are depicted as being located within the computing device 508, it is contemplated that these components of the system may be located external to the computing device 508, such as at a remote location, and may communicate with the computing device 508 via the communications network 510. For example, it is contemplated that the machine learning unit 116 may be located directly within the one or all of the measurement systems 502, 504, 506 as a form of executable instructions defining the algorithm(s) (e.g., as a software plug-in).

Figure 7:
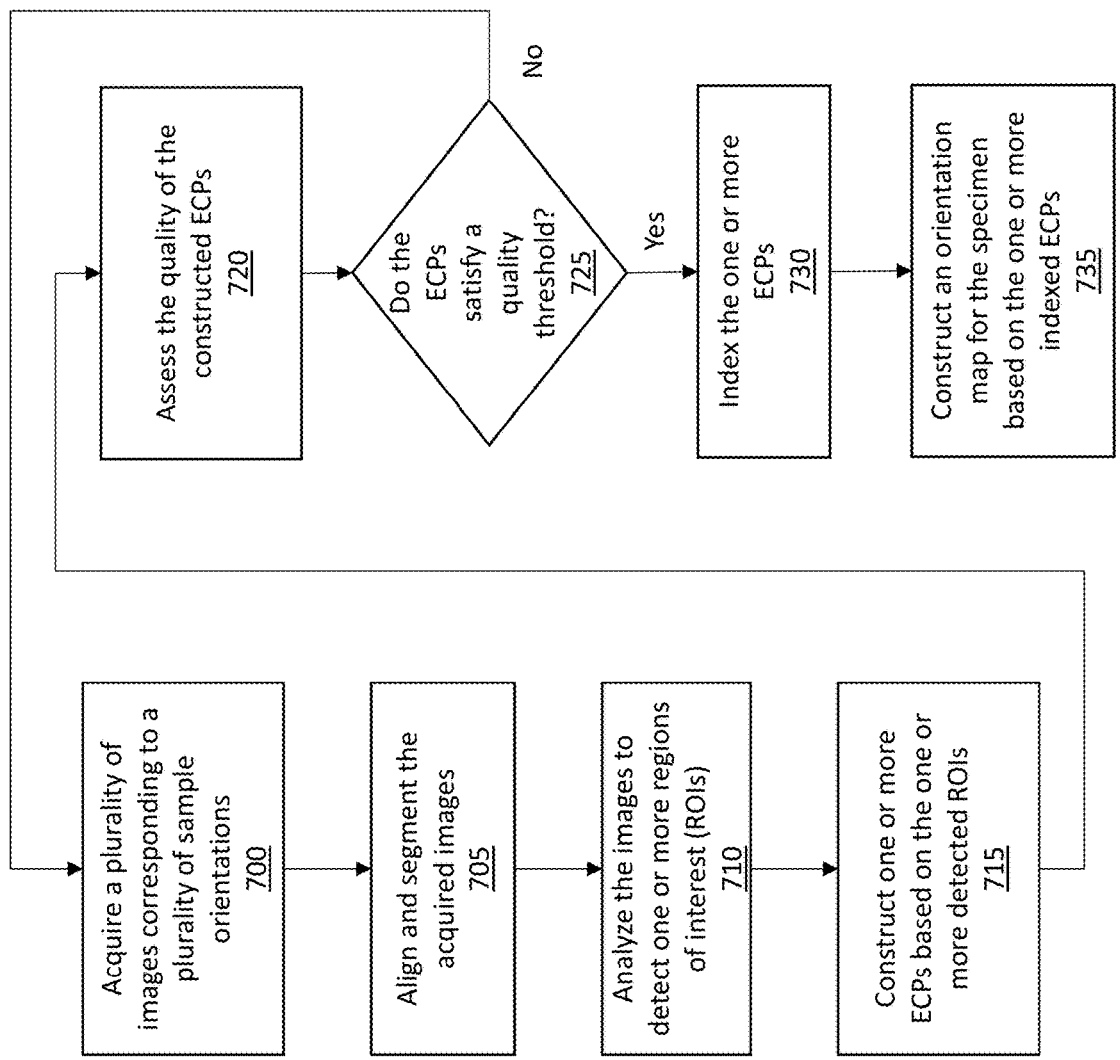
FIG. 7 is a flow diagram depicting operations performed to determine the crystal orientation of a sample specimen in accordance with an illustrative embodiment.

FIG. 7 is a flow diagram depicting operations performed to determine the crystal orientation of a sample specimen in accordance with an illustrative embodiment. In alternative embodiments, fewer, additional, and/or different operations may be performed. Also, the use of a flow diagram is not meant to be limiting with respect to the order of operations performed. In an operation 700, the system acquires a plurality of images corresponding to a plurality of sample orientations. In an illustrative embodiment, the images are taken of a specific portion of the sample, such as a defect area, a non-defect area, etc. The specific portion can be a small area or a larger area several $mm^2$ or larger. The images can be acquired using a standard detector/camera. In an illustrative embodiment, a computerized image capture unit (e.g., image capture unit 514) can be used to control one or more measurement systems (e.g., measurement systems 502, 504, 506) to repetitively alter the crystallographic orientation of the sample via the motorized sample stage. In one embodiment, the stage can be tilted/rotated to present a predetermined number of orientations and one or more images can be captured for each orientation. This process can be repeated for every ECP pixel.

In one embodiment, the computerized image capture unit of the system can monitor the intensity of backscattered electrons as an electron beam (e.g., electron beam 620) is scanned over the sample such that images of the material or structure can be obtained and processed to identify changes in crystallographic orientation. To do so, the computerized image capture unit scans the sample in a raster pattern, and images of the sample are captured by way of a line-by-line sweep of the sample. Additionally, the computerized image capture unit may use stage-rocking such that the sample specimen is tilted in two orthogonal directions with respect to the electron beam. In this way, data can be collected automatically by the computerized image capture unit through a series of rotation and tilt operations, with at least one image acquired at each operation. FIG. 4, described above, illustrates an example of the raster-scan and stage rocking movements performed by the motorized sample stage 400. The movements can be controlled by the image capture unit or other component associated with the computing device utilized by the system.

In an operation 705, the system aligns and segments the acquired images. Specifically, the system aligns the image stack relative to one another such that a complete electron channel pattern (ECP) can be extracted at each pixel, or each of one or more combinations (groups) of pixels. These channeling patterns can then be segmented or clustered (supervised vs unsupervised) into common orientations. The alignment and segmentation can be performed using any technique(s) known in the art.

In an operation 710, the system analyzes the aligned and segmented images to detect one or more regions of interest (ROIs) in the sample. In one embodiment, the ROIs can be one or more grains in the sample. Generally speaking, grains refer to individual crystals within a polycrystalline material having an arrangement of atoms that is distinct or oriented differently from its neighbors. Alternatively, the system can focus on any arbitrary location or other region of interest on a sample. For example, the system can compare deformed and non-deformed areas of a sample, the system can focus on other defect non-defect areas of a sample, etc. The detected region(s) of interest are used to construct one or more ECPs in an operation 715. The one or more ECPs are constructed by extracting the contrast value for each ROI (e.g., grain) and mapping that contrast value to an orientation space according to the sample orientation. More specifically, the physical three-dimensional (3D) rotation/tilting of the specimen with respect to the imaging lenses is mapped directly to the 3D orientation of the crystal. Thus, a single aligned set of pixels corresponding to the same physical location on the specimen, but observed at multiple orientations, is collected into a long vector. Using this vector, the intensity of each pixel in the vector is mapped to a location on a 3D sphere corresponding to the physical rotation/tilt of the specimen at the time it was recorded. This sphere is then projected to a two-dimensional (2D) image.

In an operation 720, the system assesses the quality of the constructed ECPs, and determines in an operation 725 if the quality exceeds a quality threshold. In an illustrative embodiment, the quality threshold is a measure of whether the constructed ECPs are of sufficient quality to generate an orientation map. If it is determined that the quality threshold is not satisfied in the operation 725, the system repeats operations 700-725, and this process is repeated until the quality threshold is satisfied. In another illustrative embodiment, the process continues until ECPs of sufficient quality are collected for all grains (or other regions of interest) in the image. Due to the fact that the ECP images are reasonably sparse in the gradient domain, in one embodiment, only 30% to 40% of the pixels in each ECP are used to reconstruct the entire pattern. In alternative embodiments, a lower or higher percentage of the pixels in each ECP may be used.

In one embodiment, if the ECPs are not considered to be of sufficient quality, a machine-learning algorithm can be used to predict new orientation values for the specimen that may result in the generation of ECPs with acceptable data (i.e., in which the quality of the images are acceptable). As an example, a machine-learning unit of the system can be used to initially define and generate a predictive model and continuously refine the predictive model such that, when executed, the predictive model automatically generates the predictions of specimen sample orientations that may be used in the generation or construction of the ECPs. All sample orientations can be used to reconstruct an ECP, but only a few actually contain useful information or contrast. The machine learning unit of the system predicts the subset of orientations which produce meaningful information. In some instances, the results (i.e., the predicted determinations) of executing the generated model(s) are automatically fed back into the data obtaining operation as training data. These predictions can therefore be used during the operation 700 to obtain an initial (or subsequent) subset of data from which the ECPs are generated. Each time the operation 700 is repeated, it can incorporate the new predictions into the data generation process.

If it is determined that the quality threshold is satisfied in the operation 725, the system indexes the one or more ECPs in an operation 730. The ECPs can be indexed using any indexing technique(s) known in the art. In an operation 735, an orientation map corresponding to the sample (or ROI of the sample) is constructed based on the ECPs.

Figure 8:
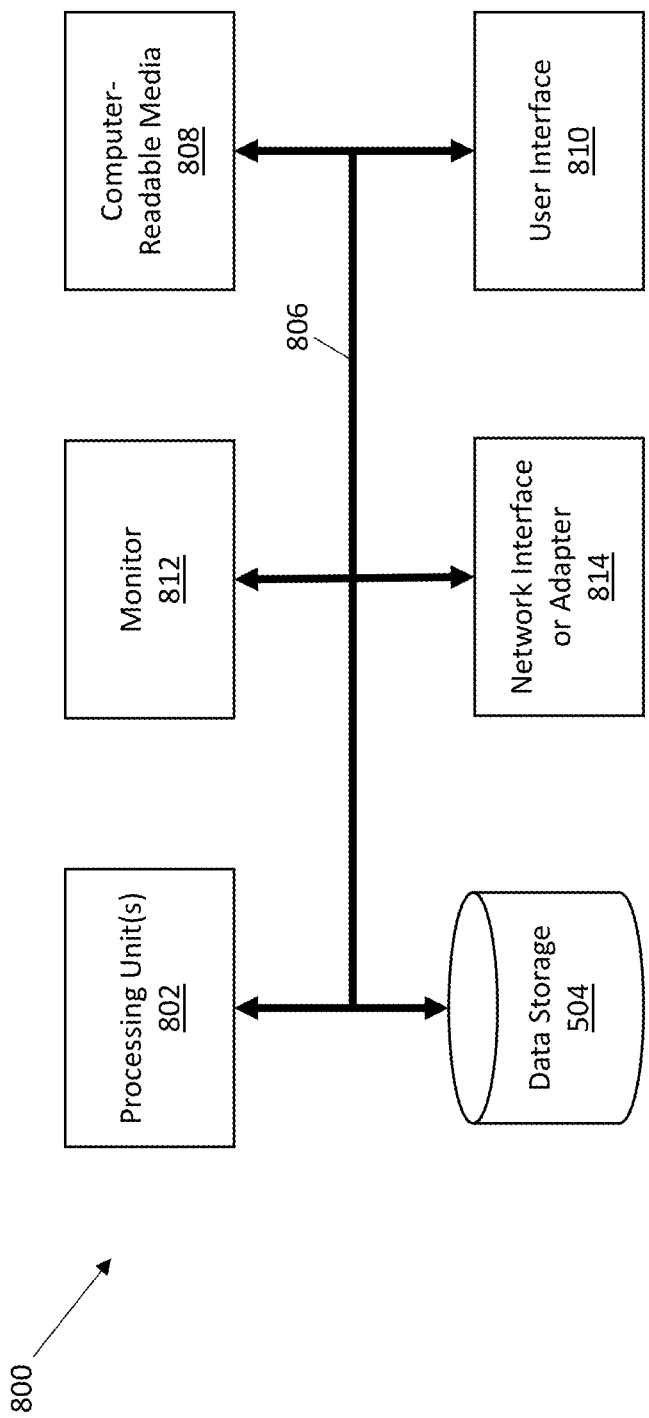
FIG. 8 is a block diagram of a computing device that can be used to execute and control any of the operations described herein in accordance with an illustrative embodiment.

FIG. 8 is a block diagram of a computing device 800 that can be used to execute and control any of the operations described herein in accordance with an illustrative embodiment. The computing device 800 can be a personal computer, server computer, hand-held or laptop computer, tablet device, multiprocessor computing system, a microprocessor-based system, a set-top box, a programmable consumer electronic device, a minicomputer, a mainframe computer, one or more digital signal processors, a state machine, one or more logic circuits, a smart phone, a distributed computing system, etc.

The computing device 800 incudes processing unit(s) 802, data storage 804 (e.g., a system memory), and a system bus 806 that couples the various system components of the computing device 800 to the processing unit(s) 802. The system bus 806 may be any of several types of bus structures including a memory bus or memory controller, a peripheral bus, and/or a local bus using any of a variety of bus architectures. For example, such architectures may include an Industry Standard Architecture (ISA) bus, a Micro Channel Architecture (MCA) bus, an Enhanced ISA (EISA) bus, a Video Electronics Standards Association (VESA) local bus, and/or a Peripheral Component Interconnect (PCI) bus.

The computing device 800 may further include a variety of computer-readable media 808 that includes removable/non-removable media and volatile/nonvolatile media, but excludes transitory propagated signals. Computer-readable media 808 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 800. The computer-readable media 808 may be embodied as a computer program product, such as software. The software can be used to perform any of the operations described herein for performing orientation mapping.

The data storage (or memory) 804 includes computer storage media in the form of volatile/nonvolatile memory such as read only memory (ROM) and random access memory (RAM). A basic input/output system (BIOS), containing the basic routines that help to transfer information between elements within the computing device 800 (e.g., during start-up) is typically stored in ROM. RAM typically contains data and/or program modules that are immediately accessible to and/or presently being operated on by the processing unit(s) 802. For example, in one embodiment, the data storage 804 stores an operating system, application programs, algorithms, and other program modules and program data. The data storage 804 can also store software in the form of computer-readable media. The computer-readable media stored in the data storage 804 (or the computer-readable media 808) can include instructions that, upon execution by the processing unit(s) 802, cause the computing device 800 to perform any of the operations, calculations, or instructions described herein to perform orientation mapping.

A user may enter commands and information through a user interface 810, which can include a microphone, keyboard, and/or pointing device, commonly referred to as mouse, trackball, or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices can be connected to the processing unit(s) 802 through the system bus 806, but may alternatively be connected by other interfaces and bus structures, such as a parallel port, game port, or a universal serial bus (USB). A monitor 812 or other type of display device is also connected to the system bus 806 via an interface, such as a video interface. The monitor 812 may also be integrated with a touch-screen panel or the like.

The computing device 800 may operate in a networked or cloud-computing environment using logical connections of a network interface or adapter 814 to one or more remote devices, such as a remote computer. The remote computer may be a personal computer, a server, a router, a network PC, a peer device or other common network node, and typically includes many or all of the elements described above relative to the computing device 800.

EXPERIMENTAL RESULTS & DATA

Figure 9A:
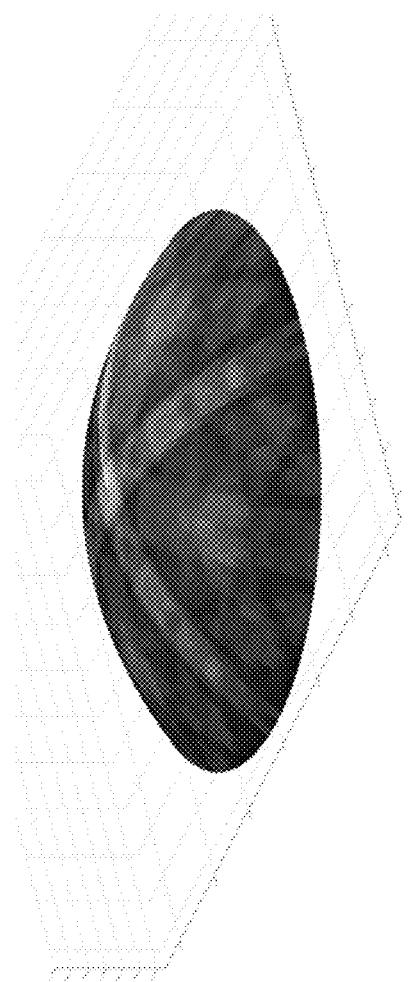
FIG. 9A is a raw channeling contrast dataset from a silicon single crystal plotted in three-dimensions using an equiangular projection in accordance with an illustrative embodiment.
Figure 9B:
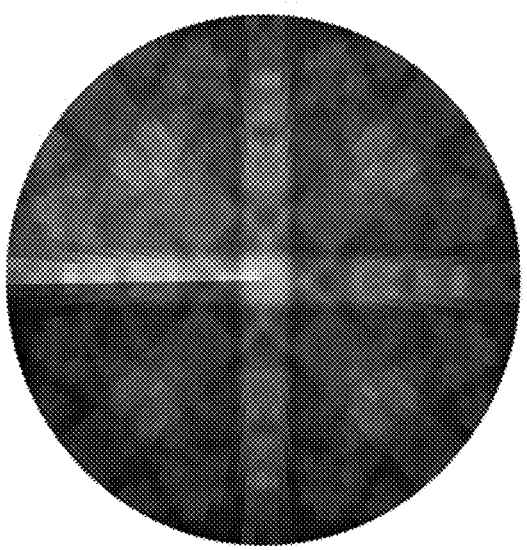
FIG. 9B is a raw channeling contrast dataset from the silicon single crystal plotted in two-dimensions using an equiangular projection in accordance with an illustrative embodiment.

In an illustrative embodiment using the proposed system, it has been shown that the channeling contrast of a sample recorded as the motorized sample stage moves around is a true spherical representation of orientation space and can be mapped to a sphere digitally. This sphere can then be projected in any of the well-known geometric projection operations. FIG. 9A is a raw channeling contrast dataset from a silicon single crystal plotted in three-dimensions using an equiangular projection in accordance with an illustrative embodiment. FIG. 9B is a raw channeling contrast dataset from the silicon single crystal plotted in two-dimensions using an equiangular projection in accordance with an illustrative embodiment.

Figures 10A, 10B:
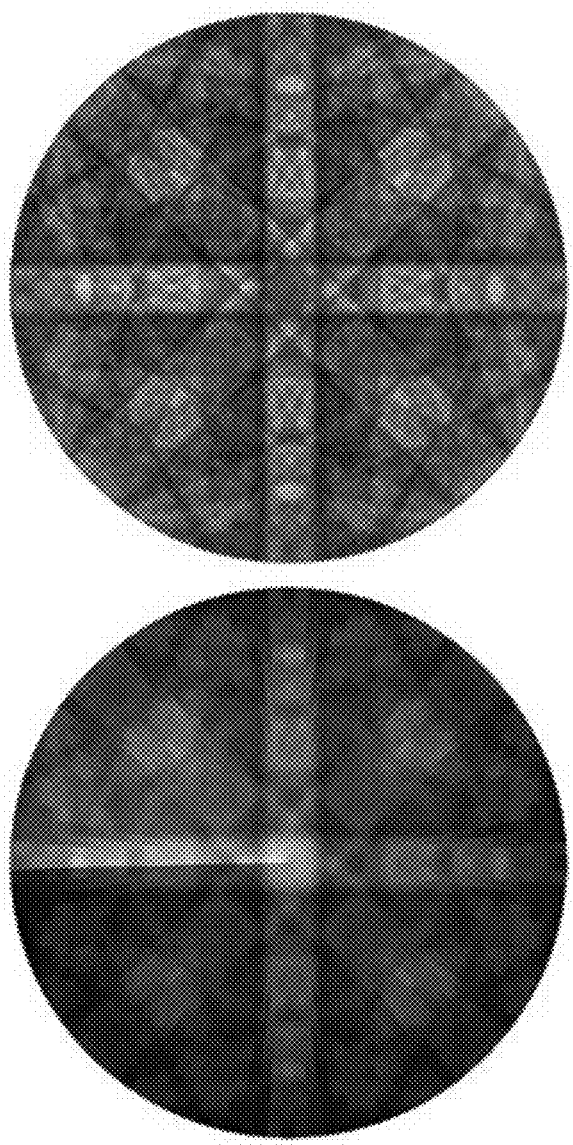
FIG. 10A depicts an orthographic projection of a stage-rocked ECP of a single-crystal silicon (100) sample in accordance with an illustrative embodiment.
FIG. 10B depicts an orthographic projection of a hybrid stage-rocked and beam-rocked ECP from a single-crystal silicon (100) sample in accordance with an illustrative embodiment.

FIG. 10A depicts an orthographic projection of a stage-rocked ECP of a single-crystal silicon (100) sample in accordance with an illustrative embodiment. The stage-rocked ECP of FIG. 10A is reconstructed from the average contrast values in 7200 ECCIs at different orientations from the single-crystal silicon (100) sample. FIG. 10B depicts an orthographic projection of a hybrid stage-rocked and beam-rocked ECP from a single-crystal silicon (100) sample in accordance with an illustrative embodiment. The ECP of FIG. 10B is reconstructed by binning each ECCI and correcting for beam divergence due to scanning. Corrections are also applied to the ECP of FIG. 10B to adjust for systematic contrast variations (i.e., background subtraction and beam contamination correction).

Figures 11A, 11B, 11C:
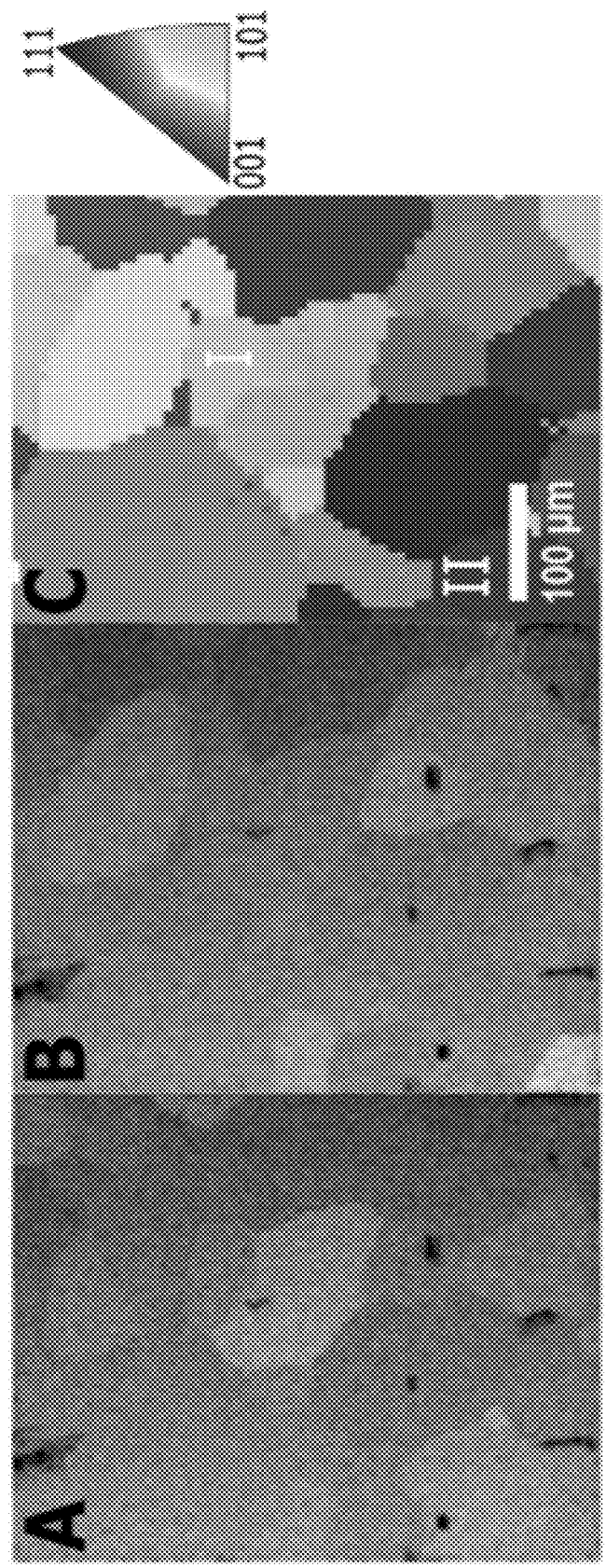
FIG. 11A depicts an aligned and perspective corrected BSE image of a PbSe-GeSe crystal sample collected at a first orientation in accordance with an illustrative embodiment.
FIG. 11B depicts an aligned and perspective corrected BSE image the same PbSe-GeSE crystal sample collected at a second orientation in accordance with an illustrative embodiment.
FIG. 11C depicts a Z-axis-referenced inverse pole figure (IPFZ) map of the same sample area imaged in FIGS. 11A-11B in accordance with an illustrative embodiment.

FIGS. 11A-11I depict comparisons between conventional EBSD techniques and the proposed orientation mapping by electron channeling (OMEC) ECP techniques on the same sample. Specifically, FIG. 11A depicts an aligned and perspective corrected BSE image of a PbSe-GeSe crystal sample collected at a first orientation in accordance with an illustrative embodiment. FIG. 11B depicts an aligned and perspective corrected BSE image the same PbSe-GeSE crystal sample collected at a second orientation in accordance with an illustrative embodiment. The first orientation of FIG. 11A is 0 degree tilt and 0 degree rotation, and the second orientation of FIG. 11B is 6 degree tilt and 0 degree rotation. FIG. 11C depicts a Z-axis-referenced inverse pole figure (IPFZ) map of the same sample area imaged in FIGS. 11A-11B in accordance with an illustrative embodiment. The IPFZ map of FIG. 11C displays the relative orientations of the member grains as indexed by an EBSD technique. In FIG. 11C, grains I and II are labeled for the following two rows of FIG. 11.

Figures 11G, 11H, 11I:
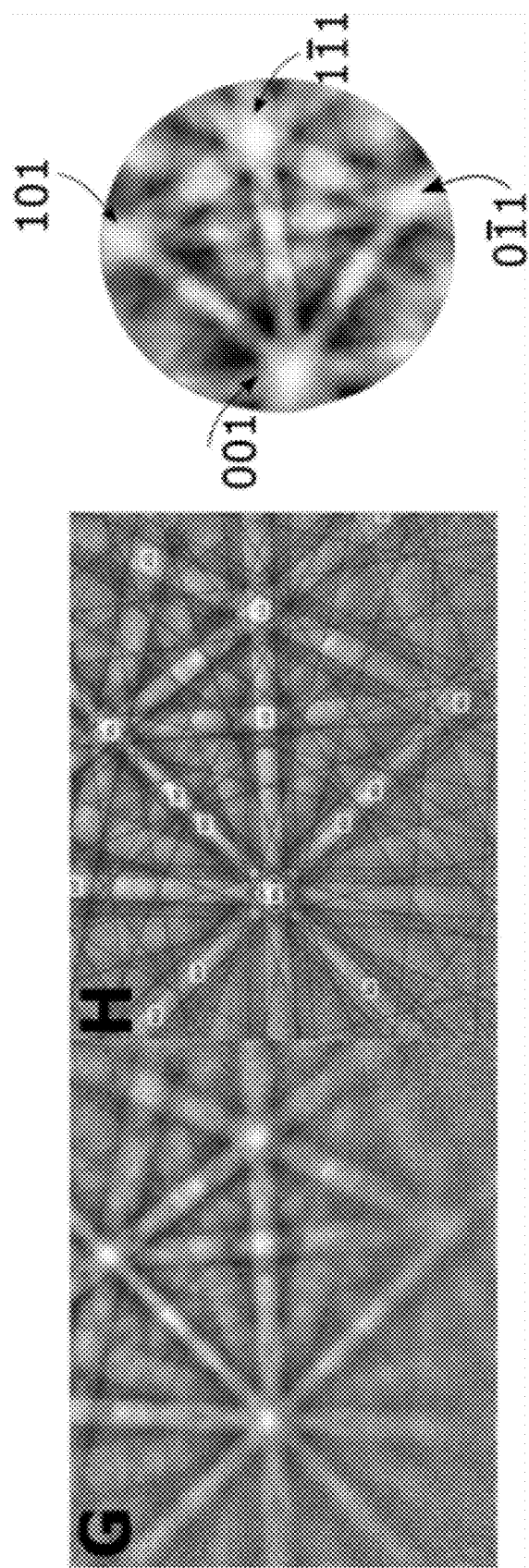
FIG. 11G depicts a representative EBSP from grain II in the IPFZ map of FIG. 11C in accordance with an illustrative embodiment.
FIG. 11H depicts a representative indexed pattern from grain II in the IPFZ map of FIG. 11C in accordance with an illustrative embodiment.
FIG. 11I depicts a representative OMEC ECO from grain II in the IPFZ map of FIG. 11C in accordance with an illustrative embodiment.

FIG. 11D depicts a representative electron backscattering pattern (EBSP) from grain I in the IPFZ map of FIG. 11C in accordance with an illustrative embodiment. FIG. 11E depicts a representative indexed pattern from grain I in the IPFZ map of FIG. 11C in accordance with an illustrative embodiment. FIG. 11F depicts a representative OMEC electron channeling pattern from grain I in the IPFZ map of FIG. 11C in accordance with an illustrative embodiment. FIG. 11G depicts a representative EBSP from grain II in the IPFZ map of FIG. 11C in accordance with an illustrative embodiment. FIG. 11H depicts a representative indexed pattern from grain II in the IPFZ map of FIG. 11C in accordance with an illustrative embodiment. FIG. 11I depicts a representative OMEC ECO from grain II in the IPFZ map of FIG. 11C in accordance with an illustrative embodiment. As shown in FIGS. 11D-11I, there is strong agreement between the ECP and EBSP. In order to assist in identifying correlation between the EBSPs and the OMEC ECPs, the ECPs were projected stereographically (i.e., equiangular constructions).

Figure 12A:
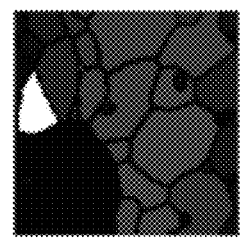
FIG. 12A depicts a first grain and corresponding orthographically projected channeling pattern in accordance with an illustrative embodiment.
Figure 12B:
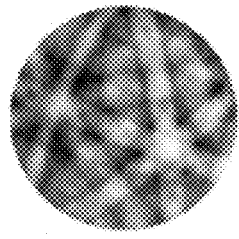
FIG. 12B depicts a second grain and corresponding orthographically projected channeling pattern in accordance with an illustrative embodiment.
Figure 12C:
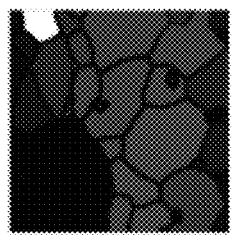
FIG. 12C depicts a third grain and corresponding orthographically projected channeling pattern in accordance with an illustrative embodiment.
Figure 12D:
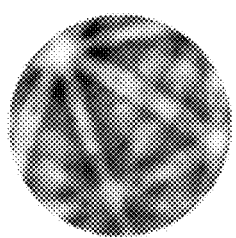
FIG. 12D depicts a fourth grain and corresponding orthographically projected channeling pattern in accordance with an illustrative embodiment.
Figure 12E:
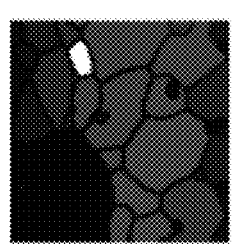
FIG. 12E depicts a fifth grain and corresponding orthographically projected channeling pattern in accordance with an illustrative embodiment.
Figure 12F:
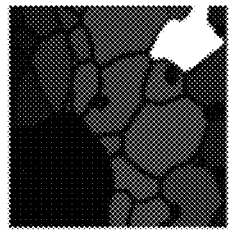
FIG. 12F depicts a sixth grain and corresponding orthographically projected channeling pattern in accordance with an illustrative embodiment.
Figure 12G:
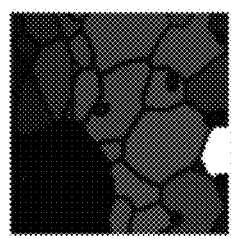
FIG. 12G depicts a seventh grain and corresponding orthographically projected channeling pattern in accordance with an illustrative embodiment.

FIG. 12A depicts a first grain and corresponding orthographically projected channeling pattern in accordance with an illustrative embodiment. FIG. 12B depicts a second grain and corresponding orthographically projected channeling pattern in accordance with an illustrative embodiment. FIG. 12C depicts a third grain and corresponding orthographically projected channeling pattern in accordance with an illustrative embodiment. FIG. 12D depicts a fourth grain and corresponding orthographically projected channeling pattern in accordance with an illustrative embodiment. FIG. 12E depicts a fifth grain and corresponding orthographically projected channeling pattern in accordance with an illustrative embodiment. FIG. 12F depicts a sixth grain and corresponding orthographically projected channeling pattern in accordance with an illustrative embodiment. FIG. 12G depicts a seventh grain and corresponding orthographically projected channeling pattern in accordance with an illustrative embodiment.

In FIGS. 12A-12G, the true data for each grain is a real 3D dataset and thus has none of the distortion characteristic of EBSD. As a result, data obtained using the proposed system can be projected down to two dimensions in many ways depending on the purpose (e.g., stereographic for indexing, orthographic for intuitive visualization, etc.). Also, for small grains, there is still sufficient signal-to-noise ratio (SNR) to resolve many bands. In addition, the large field of view enabled by a stage-rocked channeling pattern means that every pattern has enough bands (>3) to enable an accurate indexing.

Figure 13:
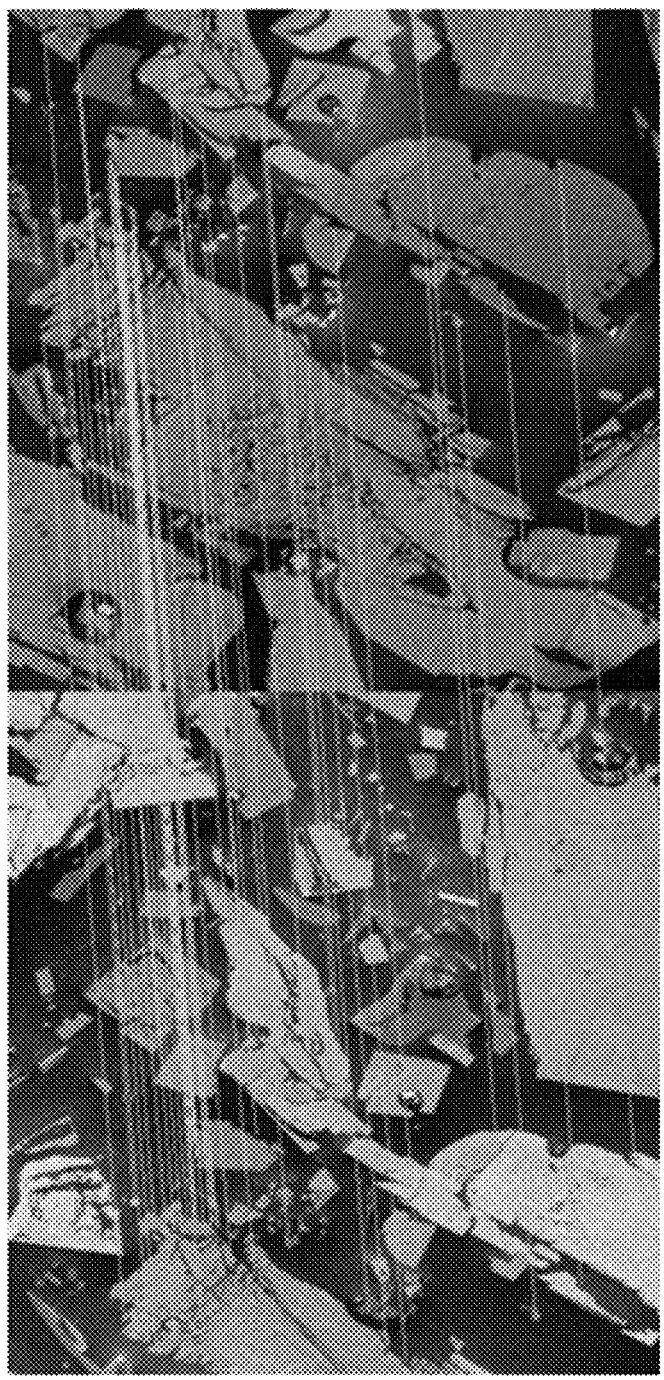
FIG. 13 depicts how contrast invariant feature detectors are used to map salient features from one tilt and rotation to another, allowing registration of complicated images and extraction of ECPs from polycrystalline aluminum samples in accordance with an illustrative embodiment.

FIG. 13 depicts how contrast invariant feature detectors are used to map salient features from one tilt and rotation to another, allowing registration of complicated images and extraction of ECPs from polycrystalline aluminum samples in accordance with an illustrative embodiment. In the left portion of FIG. 13 a 0 degree tilt and 0 degree rotation image is aligned against the right portion, which has 20 degree tilt and 90 degree rotation image. The angled lines across the left-right portions of FIG. 13 connect similar features detected in the two images.

For polycrystalline samples, images are first aligned as there is inevitable image shift and distortion with stage tilting and rotation. In addition, the contrast between images captured at different tilts can change drastically due to the channeling contrast. However, using a contrast invariant transform, there are still enough edge-like common features between highly dissimilar images to do highly accurate alignment. An example of common edge like features between the two tilted images of an aluminum polycrystalline surface are displayed in FIG. 13, as discussed above. The relative distances between these features in both images are used to infer the correct alignment between the two images. After image alignment, grains in the sample can be automatically segmented and individual stage-rocking raster-scan ECPs (SRECPs) can be reconstructed for each.

FIGS. 14A-14F depict a simulated OMEC acquisition from calculated channeling patterns of Austenite in accordance with illustrative embodiments. Specifically, FIG. 14A depicts a simulated BSE image at 0 degree tilt and 0 degree rotation for the four reconstructed orientations of FIGS. 14B, 14C, 14E, and 14F in accordance with an illustrative embodiment. FIGS. 14B, 14C, 14E, and 14F are reconstructed channeling patterns for four differently oriented Austenitic grains in a polycrystalline microstructure after sampling 10% of the possible tilts/rotations using dynamic sampling in accordance with an illustrative embodiment. When choosing which tilts/rotations to sample, the dynamic sampling approach chooses the point with the most benefit for all four grains simultaneously (multi-objective). FIG. 14D depicts a mask of selected tilts/rotations, with white representing a sample position where a simulated BSE image was recorded, and black representing skipped sample positions in accordance with an illustrative embodiment.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system to generate orientation maps, the system comprising:
    a measurement system configured to capture a plurality of images of a sample; and
    a computing device, in operable communication with the measurement system, wherein the computing device is configured to:
    align the plurality of images of the sample;
    process the aligned plurality of images to detect one or more regions of interest;
    generate one or more electron channeling patterns (ECPs) corresponding to the sample based on the one or more regions of interest;
    determine if a quality of the one or more ECPs satisfies a quality threshold, wherein, responsive to a determination that the one or more ECPs do not satisfy the quality threshold, the computing device is configured to capture additional images until the quality threshold is satisfied; and
    generate an orientation map of the sample based on the one or more ECPs.

2. The system of claim 1, wherein the sample is at a distinct orientation in each of the plurality of images.

3. The system of claim 2, wherein the measurement system includes a motorized stage that is configured to move the sample to an arbitrary beam-sample orientation, and wherein the distinct orientation for each of the plurality of images corresponds to a distinct beam-sample orientation.

4. The system of claim 1, wherein the computing device generates a distinct ECP for each pixel or each of a plurality of combinations of pixels in the aligned plurality of images.

5. The system of claim 1, wherein the measurement system is configured to perform stage-rocking and beam-rocking to capture the plurality of images.

6. The system of claim 1, wherein the computing device is configured to mine ECP data to extract electron channeling contrast imaging (ECCI) images at an arbitrary beam-sample orientation to perform defect imaging.

7. The system of claim 1, wherein the measurement system is configured to capture lattice parameter information for strain analysis by higher-order Laue zone detection.

8. The system of claim 1, wherein the measurement system is configured to prioritize a subset of the plurality of images captured at specific angles and orientations.

9. The system of claim 1, wherein the computing device is configured to use a machine-learning algorithm to generate a predictive model of orientation values for the sample that result in usable images to generate the one or more ECPs.

10. The system of claim 1, wherein a reduced subset of available pixels are used to generate each ECP.

11. The system of claim 1, wherein the computing device is configured to perform background subtraction and beam contamination correction to improve a quality of each of the one or more ECPs.

12. A method for performing orientation mapping, the method comprising:
    capturing, by a measurement system, a plurality of images of a sample;
    capturing, by the measurement system, lattice parameter information for strain analysis by higher-order Laue zone detection;
    aligning, by a computing device in communication with the measurement system, the plurality of images of the sample;
    processing, by the computing device, the aligned plurality of images to detect one or more regions of interest;
    generating, by the computing device, one or more electron channeling patterns (ECPs) corresponding to the sample based on the one or more regions of interest; and
    generating, by the computing device, an orientation map of the sample based on the one or more ECPs.

13. The method of claim 12, further comprising moving, by a motorized sample stage, the sample into a plurality of orientations such that the sample is at a distinct orientation in each of the plurality of images.

14. The method of claim 12, wherein generating the one or more ECPs comprises generating a distinct ECP for each pixel or each of a plurality of combinations of pixels in the aligned plurality of images.

15. The method of claim 12, further comprising performing, by the measurement system, stage-rocking and beam-rocking to capture the plurality of images.

16. The method of claim 12, further comprising determining, by the computing device, if a quality of the one or more ECPs satisfies a quality threshold.

17. The method of claim 16, further comprising capturing, by the measurement device and responsive to a determination that the one or more ECPs do not satisfy the quality threshold, additional images until the quality threshold is satisfied.

* * * * *